(12) United States Patent
Di Censo et al.

(10) Patent No.: US 10,035,539 B2
(45) Date of Patent: Jul. 31, 2018

(54) STEERING WHEEL CONTROL SYSTEM

(71) Applicant: HARMAN INTERNATIONAL INDUSTRIES, INC., Stamford, CT (US)

(72) Inventors: Davide Di Censo, Oakland, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/805,377

(22) Filed: Jul. 21, 2015

(65) Prior Publication Data

US 2016/0185385 A1 Jun. 30, 2016

Related U.S. Application Data

(60) Provisional application No. 62/098,967, filed on Dec. 31, 2014.

(51) Int. Cl.
*B62D 6/00* (2006.01)
*B60R 16/027* (2006.01)
*B60K 35/00* (2006.01)
*B62D 1/04* (2006.01)
*B62D 1/06* (2006.01)
*G06F 3/01* (2006.01)

(52) U.S. Cl.
CPC ............... *B62D 6/00* (2013.01); *B60K 35/00* (2013.01); *B60R 16/027* (2013.01); *B62D 1/046* (2013.01); *B62D 1/06* (2013.01); *G06F 3/017* (2013.01); *B60K 2350/1024* (2013.01); *B60K 2350/1052* (2013.01); *B60K 2350/35* (2013.01)

(58) Field of Classification Search
None
See application file for complete search history.

(56) References Cited

U.S. PATENT DOCUMENTS

2012/0179328 A1 7/2012 Goldman-Shenhar
2012/0326735 A1* 12/2012 Bennett ................ B62D 1/046
324/705

(Continued)

FOREIGN PATENT DOCUMENTS

JP 2013025620 A 2/2013
JP 2013079061 A 5/2013

(Continued)

OTHER PUBLICATIONS

European Search Report Application No. 15-20 2986, dated Apr. 22, 2016, 8 pages.

*Primary Examiner* — James M McPherson
(74) *Attorney, Agent, or Firm* — Artegis Law Group, LLP

(57) ABSTRACT

Embodiments of the present disclosure set forth a technique for modifying different vehicle parameters based on bimanual input. The technique includes acquiring sensor data associated with a first finger and a second finger of a user. The technique further includes analyzing the sensor data to determine a first location of the first finger and a second location of the second finger. The technique further includes selecting a first vehicle parameter based on the first location of the first finger, and modifying the first vehicle parameter based on the second location of the second finger.

20 Claims, 8 Drawing Sheets

(56) References Cited

U.S. PATENT DOCUMENTS

| | | | |
|---|---|---|---|
| 2014/0022070 A1* | 1/2014 | Golomb | B60Q 1/0082 |
| | | | 340/475 |
| 2014/0152549 A1* | 6/2014 | Kim | G06F 3/005 |
| | | | 345/156 |
| 2014/0156107 A1 | 6/2014 | Karasawa et al. | |
| 2014/0292661 A1 | 10/2014 | Graumann et al. | |
| 2016/0062531 A1* | 3/2016 | Karasawa | G01C 21/3664 |
| | | | 701/36 |
| 2016/0185385 A1* | 6/2016 | Di Censo | B62D 6/00 |
| | | | 701/41 |

FOREIGN PATENT DOCUMENTS

| | | | | |
|---|---|---|---|---|
| WO | WO2014/085277 | * | 5/2014 | G06F 7/00 |
| WO | 2014085277 A1 | | 6/2014 | |

* cited by examiner

STEERING WHEEL CONTROL SYSTEM

CROSS-REFERENCE TO RELATED APPLICATIONS

This application claims benefit of the U.S. provisional patent application Ser. No. 62/098,967, filed Dec. 31, 2014. The subject matter of these related applications is hereby incorporated herein by reference.

BACKGROUND

Field of the Embodiments

Embodiments of the present disclosure generally relate to human-vehicle interfaces and, more specifically, to a steering wheel control system.

Description of the Related Art

Modern vehicles typically include a variety of subsystems, including a multimedia subsystem, a climate control subsystem, vehicle throttle/steering subsystems, as well as other types of subsystems for controlling various aspects of the vehicle and related components. To enable a user to interact with each subsystem, a vehicle generally includes several control panels, each of which may be dedicated to controlling one or more of the subsystems. For example, a vehicle may include a dashboard-mounted control panel having a multimedia interface and a climate control interface. In addition, a vehicle may include one or more panels that are located near the steering wheel and include interfaces for controlling throttle subsystems, such as cruise control.

One issue confronted when interacting with the panels described above is that the driver of the vehicle is required to remove at least one hand from the steering wheel in order to control the corresponding subsystems. For example, the driver must remove one of his/her hands from the steering wheel in order to interact with the navigation system and/or adjust the temperature or fan speed via the climate control interface. Consequently, the driver must divert his/her attention away from the act of driving in order to interact with the vehicle subsystems. Such diversions reduce the ability of the driver to safely operate the vehicle, potentially compromising the safety of both occupants of the vehicle and those in the surrounding environment.

As the foregoing illustrates, techniques for controlling subsystems within a vehicle without requiring a driver to remove his/her hands from the steering wheel would be useful.

SUMMARY

Embodiments of the present disclosure set forth a method for modifying a vehicle parameter based on bimanual input. The method includes acquiring sensor data associated with a first finger and a second finger of a user. The method further includes analyzing the sensor data to determine a first location of the first finger and a second location of the second finger, and selecting a first vehicle parameter based on the first location of the first finger. The method further includes modifying the first vehicle parameter based on the second location of the second finger.

Further embodiments provide, among other things, a system and a non-transitory computer-readable storage medium configured to implement the techniques set forth above.

At least one advantage of the disclosed technique is that a user is able to modify parameters associated with various types of vehicle systems without looking away from the road and/or without taking his or her hands off of the steering wheel. Accordingly, the steering wheel controls can be operated with a low cognitive load, reducing the degree to which operation of vehicle systems distracts the driver from driving tasks.

BRIEF DESCRIPTION OF THE SEVERAL VIEWS OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may include equally effective embodiments.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1:
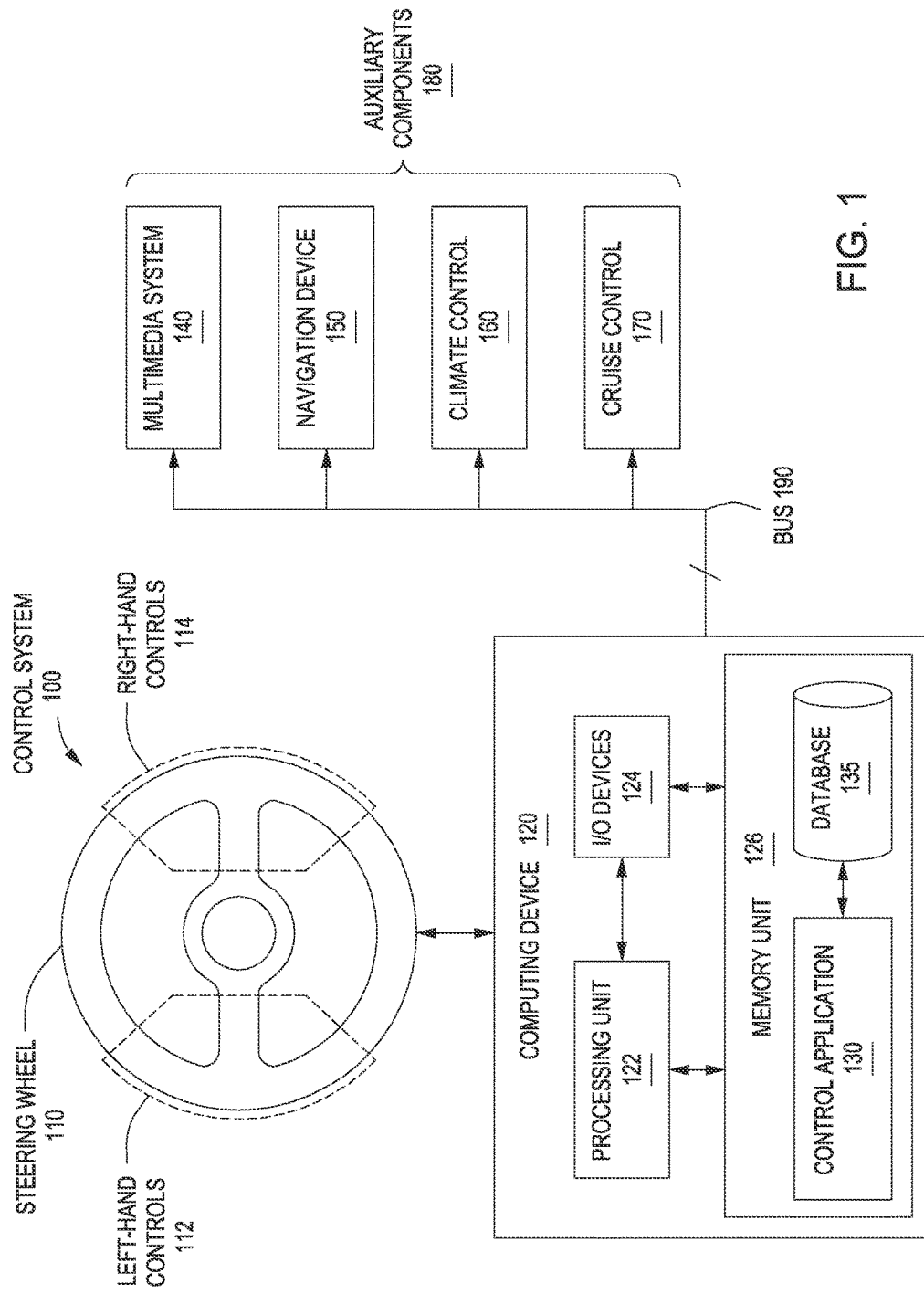
FIG. 1 illustrates a system for recognizing user input and modifying vehicle parameters, according to various embodiments.

FIG. 1 illustrates a system 100 for recognizing user input and modifying vehicle parameters, according to various embodiments. The system 100 includes a steering wheel 110, a computing device 120, and auxiliary components 180. The steering wheel 110 includes left-hand controls 112 and right-hand controls 114. The left-hand controls 112 and right-hand controls 114 include one or more types of sensors configured to acquire data associated with both hands of a user (e.g., bimanual input). The auxiliary components 180 are coupled to the computing device 120 via a bus 190 and include one or more vehicle subsystems, such as a multimedia system 140, a navigation system 150, a climate control system 160, and a cruise control system 170. Each of the auxiliary components 180 is associated with one or more vehicle parameters that can be modified via the left-hand controls 112 and right-hand controls 114.

Computing device 120 includes a processing unit 122, input/output (I/O) devices 124, and a memory unit 126. In various embodiments, computing device 120 may be a mobile computer, a system-on-a-chip (SoC), infotainment system, navigation system, mobile device, mobile phone, personal digital assistant, or any other device suitable for practicing one or more embodiments of the disclosure. As shown, computing device 120 is configured to receive input from the left-hand controls 112 and right-hand controls 114. Computing device 120 may also be coupled to one or more output devices associated with the system 100 that include one or more devices, such as haptic devices and/or speakers configured to generate feedback for a user.

Generally, computing device 120 is configured to coordinate the overall operation of the system 100. In other embodiments, the computing device 120 may be coupled to, but separate from the system 100. In such embodiments, the system 100 may include a separate processor that receives data (e.g., sensor data) from and transmits data (e.g., vehicle parameters) to the computing device 120. In general, any technically feasible system configured to implement the functionality of the system 100 falls within the scope of the present disclosure.

Processing unit 122 may include a central processing unit (CPU), digital signal processing unit (DSP), and so forth. In various embodiments, the processing unit 122 is configured to analyze sensor data acquired via the left-hand controls 112 and right-hand controls 114 to detect user input. Additionally, the processing unit 122 may be configured to modify vehicle parameters associated with one or more auxiliary components 180 being controlled by the system 100. For example, and without limitation, the processing unit 122 may execute a control application 130 that processes sensor data acquired by the left-hand controls 112 and right-hand controls 114 and determines how one or more vehicles parameters should be modified.

I/O devices 124 may include input devices, output devices, and devices capable of both receiving input and providing output. For example, and without limitation, I/O devices 124 may include wired and/or wireless communication devices that send data to and/or receive data from the left-hand controls 112 and/or right-hand controls 114. Memory unit 126 may include a memory module or a collection of memory modules. Control application 130 within memory unit 126 may be executed by the processing unit 122 to implement the overall functionality of the system 100. The database 135 may store sensor data, gesture recognition data, display data, vehicle parameters, and the like.

In operation, sensor data acquired via the left-hand controls 112 and right-hand controls 114 is processed by the control application 130 to determine the locations and/or orientations of the user's hand(s), arm(s), and/or finger(s). Next, the locations and/or orientations of the user's hand(s), arm(s), and/or finger(s) are analyzed by the control application 130 to determine which vehicle parameter is being selected by the user and how the vehicle parameter is to be modified (e.g., by toggling the vehicle parameter or increasing/decreasing the vehicle parameter by a certain amount). For example, and without limitation, as described in further detail below, the left-hand controls 112 may be used to select which vehicle parameter is to be modified, and the right-hand controls 114 may be used to specify how that vehicle parameter is to be modified. Alternatively, the right-hand controls 114 may be used to select which vehicle parameter is to be modified, and the left-hand controls 112 may be used to specify how that vehicle parameter is to be modified.

In various embodiments, the control application 130 modifies a vehicle parameter based on determining that user input was received via the left-hand controls 112 (e.g., to select the vehicle parameter) at substantially the same time as user input was received via the right-hand controls 114 (e.g., to specify how the vehicle parameter is to be modified). Requiring bimanual user input to be received via the left-hand controls 112 and the right-hand controls 114 at substantially the same time may enable the control application 130 to ignore accidental user interactions with the left-hand controls 112 and/or the right-hand controls 114 and, thus, more accurately determine the intentions of a user. In some embodiments, the control application 130 modifies a vehicle parameter based on determining that user input was received via the left-hand controls 114 a threshold period of time (e.g., 1 to 3 seconds) before or after user input was received via the right-hand controls 114. Modifying a vehicle parameter only when bimanual user input is received via the left-hand controls 112 and the right-hand controls 114 within a threshold period of time enables the control application 130 to effectively determine the intentions of a user, without overly burdening the user with a requirement that commands be inputted at substantially the same time.

In some embodiments, the left-hand controls 112 and/or right-hand controls 114 detect user input via one or more visual sensors (e.g., cameras) and/or one or more touch sensors (e.g., capacitive sensors, resistive sensors, inductive sensors) configured to acquire data associated with the hand(s), arm(s), and/or finger(s) of a user. For example, and without limitation, the left-hand controls 112 and/or right-hand controls 114 could detect user input via one or more cameras that capture images of the user's hands and/or the steering wheel 110. The images could then be analyzed by the control application 130 to determine the location(s) of one or more fingers of the user with respect to specific regions of the left-hand controls 112 and/or right-hand controls 114. A vehicle parameter and a modification to the vehicle parameter could then be determined based on the location(s) of one or more fingers of the user with respect to regions of the left-hand controls 112 and/or right-hand controls 114. In a non-limiting example, the control application 130 could determine (e.g., via sensor data acquired by a camera) that the left thumb of the user is located within a first region of the left-hand controls 112, and that the right thumb of the user is located within a second region of the right-hand controls 114. In response, the control application 130 could select a vehicle parameter associated with the first region of the left-hand controls 112 and modify the vehicle parameter by an amount associated with the second region of the right-hand controls 114.

In other embodiments, the left-hand controls 112 and/or right-hand controls 114 could detect user input via one or more touch sensors. Sensor data acquired by the touch sensor(s) could then be analyzed by the control application 130 to determine that the finger(s) (e.g., thumbs) of the user are located at specific regions within the left-hand controls 112 and/or right-hand controls 114. A vehicle parameter and a modification to the vehicle parameter could then be determined based on the regions of the left-hand controls 112 and/or right-hand controls 114 being selected by the user. For example, and without limitation, as described above, the control application 130 could select a vehicle parameter associated with a region of the left-hand controls 112 being selected by a left thumb of the user, and the control application 130 could modify the vehicle parameter by an amount associated with the region of the right-hand controls 114 being selected by a right thumb of the user. Alternatively, as described above, the functions of the left-hand controls 112 and/or right-hand controls 114 could be switched, such that the right thumb selects a vehicle parameter and the left thumb toggles the vehicle parameter and/or selects an amount by which the vehicle parameter is to be modified.

In still other embodiments, the left-hand controls 112 could be implemented via a rocker switch that allows a user to scan through and select between multiple vehicle parameters. Similarly, the right-hand controls 114 could be implemented via a rocker switch that allows a user to toggle, increase, and/or decrease a selected vehicle parameter. Additionally, in some embodiments, the left-hand controls 112 and/or right-hand controls 114 could include any other technically feasible sensors for detecting the location and/or orientation of a finger, hand, or arm of a user. Other types of sensors that could be implemented with the left-hand controls 112 and/or right-hand controls 114 to detect user input include force sensors, depth sensors, infrared sensors, time-of-flight sensors, ultrasound sensors, radar sensors, laser sensors, thermal sensors, structured light sensors, and/or other types of sensors. Force sensors that may be implemented with the left-hand controls 112 and/or right-hand controls 114 include, without limitation, pressure sensors, pneumatic sensors, strain gauge load cells, and/or piezoelectric crystals that are disposed in and/or coupled to the steering wheel 110.

Figure 2:
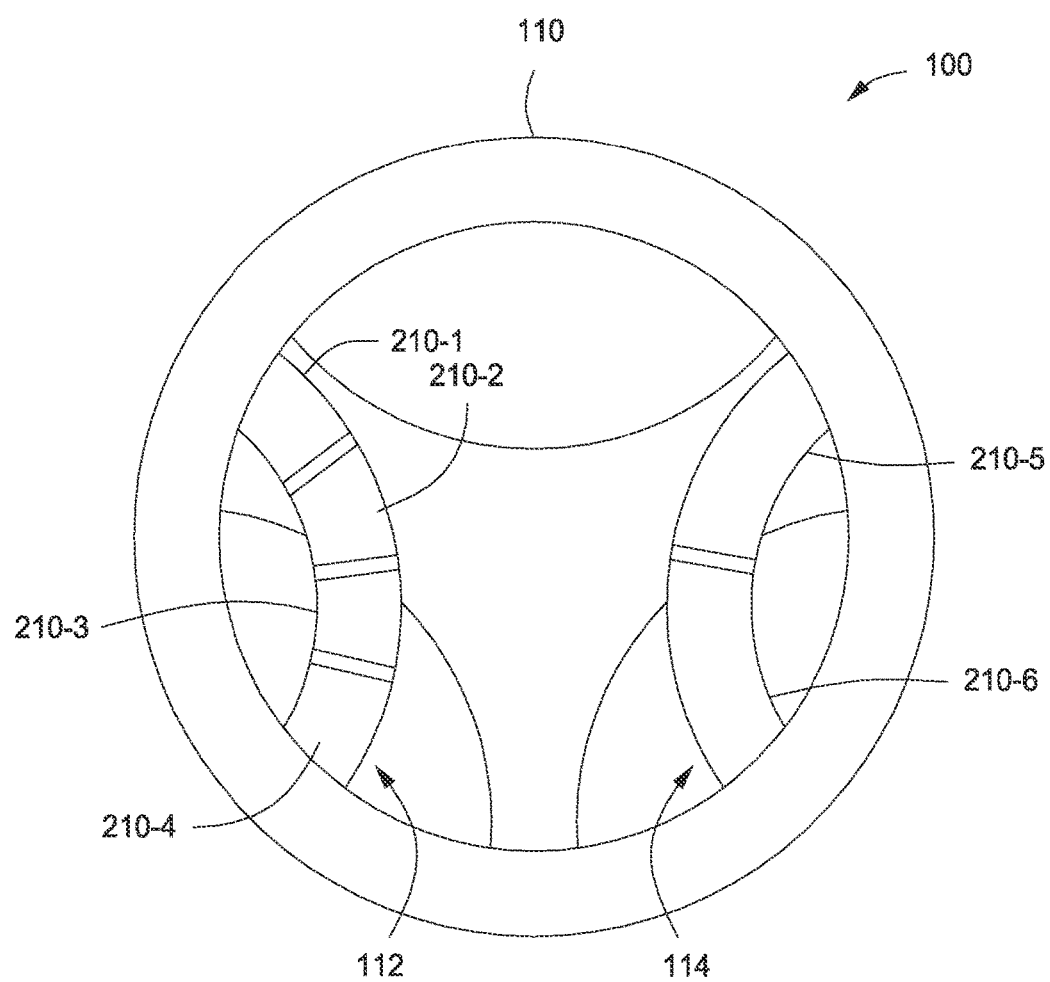
FIG. 2 illustrates input regions that may be implemented in conjunction with the left-hand controls and right-hand controls of FIG. 1, according to various embodiments.

FIG. 2 illustrates input regions 210 that may be implemented in conjunction with the left-hand controls 112 and right-hand controls 114 of FIG. 1, according to various embodiments. As shown, in some embodiments, the left-hand controls 112 and right-hand controls 114 include multiple input regions 210 arranged in semi-circular configurations. In general, the left-hand controls 112 and right-hand controls 114 may implement any of the sensor types described above to detect user input within each input region 210. For purposes of illustration, the embodiments described below implement the left-hand controls 112 to select a vehicle parameter to be modified and implement the right-hand controls 114 to specify how the vehicle parameter will be modified. However, in various embodiments, some or all of the functionality described herein as being implemented via the left-hand controls 112 may instead be implemented via the right-hand controls 114, and some or all of the functionality described herein as being implemented via the right-hand controls 114 may instead be implemented via the left-hand controls 112.

In some embodiments, each of the input regions 210 is associated with a different vehicle parameter and/or vehicle parameter modifier. For example, in embodiments where the left-hand controls 112 are configured to select a vehicle parameter to be modified, each of input regions 210-1 through 210-4 could be associated with a different auxiliary component 180. In a specific embodiment, input region 210-1 is associated with navigation system 150 parameter (e.g., pan, tilt, zoom, next/previous turn), input region 210-2 is associated with a multimedia system 140 parameter (e.g., volume, track, folder, source), input region 210-3 is associated with a climate control system 160 parameter (e.g., temperature, fan speed, zone, mode), and input region 210-4 is associated with a cruise control system 170 parameter (e.g., toggle on/off, speed, lane change). Alternatively, two or more of input regions 210-1 through 210-4 could be configured to select different vehicle parameters associated with the same auxiliary component 180.

Additionally, in embodiments where the right-hand controls 114 are configured to modify a vehicle parameter (e.g., by toggling the vehicle parameter and/or by increasing/decreasing the vehicle parameter), each of input regions 210-5 and 210-6 could be associated with a different state (e.g., on/off) or modification amount. In a specific embodiment, input region 210-5 is associated with an 'on' state and/or an increase operation (e.g., to increase the selected vehicle parameter), and input region 210-6 is associated with an 'off' state and/or a decrease operation (e.g., to decrease the selected vehicle parameter).

In various embodiments, input regions 210 associated with the left-hand controls 112 and/or right-hand controls 114 include topographical features (e.g., unique surface features) that enable a user to haptically identify the input regions 210. Accordingly, the user may be able to determine the locations of the input regions 210 without diverting his or her eyes away from the road and/or may more quickly learn (e.g., via muscle memory) the location of each of the input regions 210. In other embodiments, the left-hand controls 112 and/or right-hand controls 114 do not include any topographical features and/or visual markings that delineate the different input regions 210. Consequently, although the input regions 210 illustrated in FIG. 2 are shown as visible regions, in the embodiments described herein, there may not be any visible delineation of the input regions 210. For example, and without limitation, the input regions 210 could instead correspond to regions of the steering wheel 110, such as specific areas located within the perimeter of the steering wheel 110.

Figure 3A:
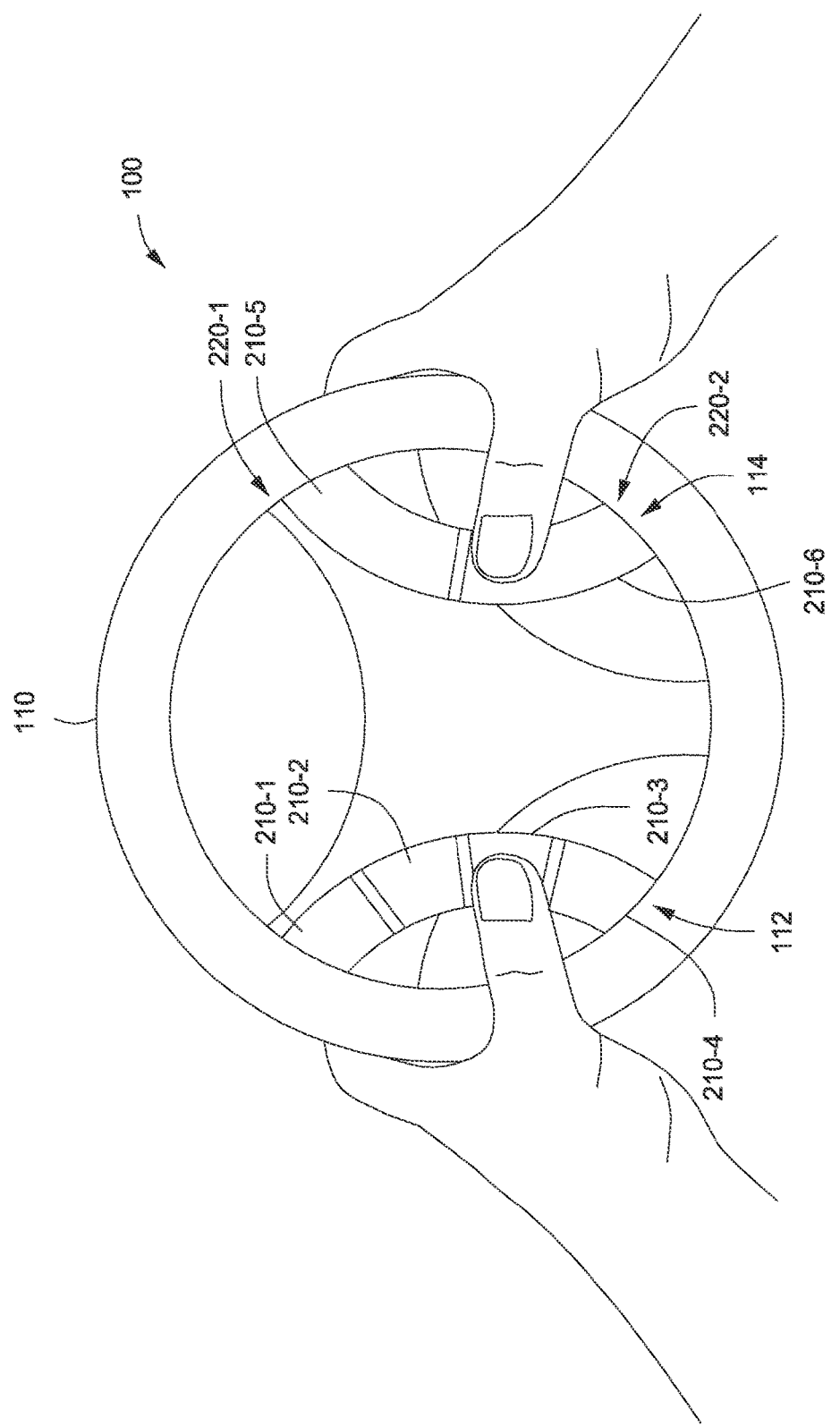
FIGS. 3A and 3B illustrate techniques for modifying different vehicle parameters via the input regions of FIG. 2, according to various embodiments.
Figure 3B:
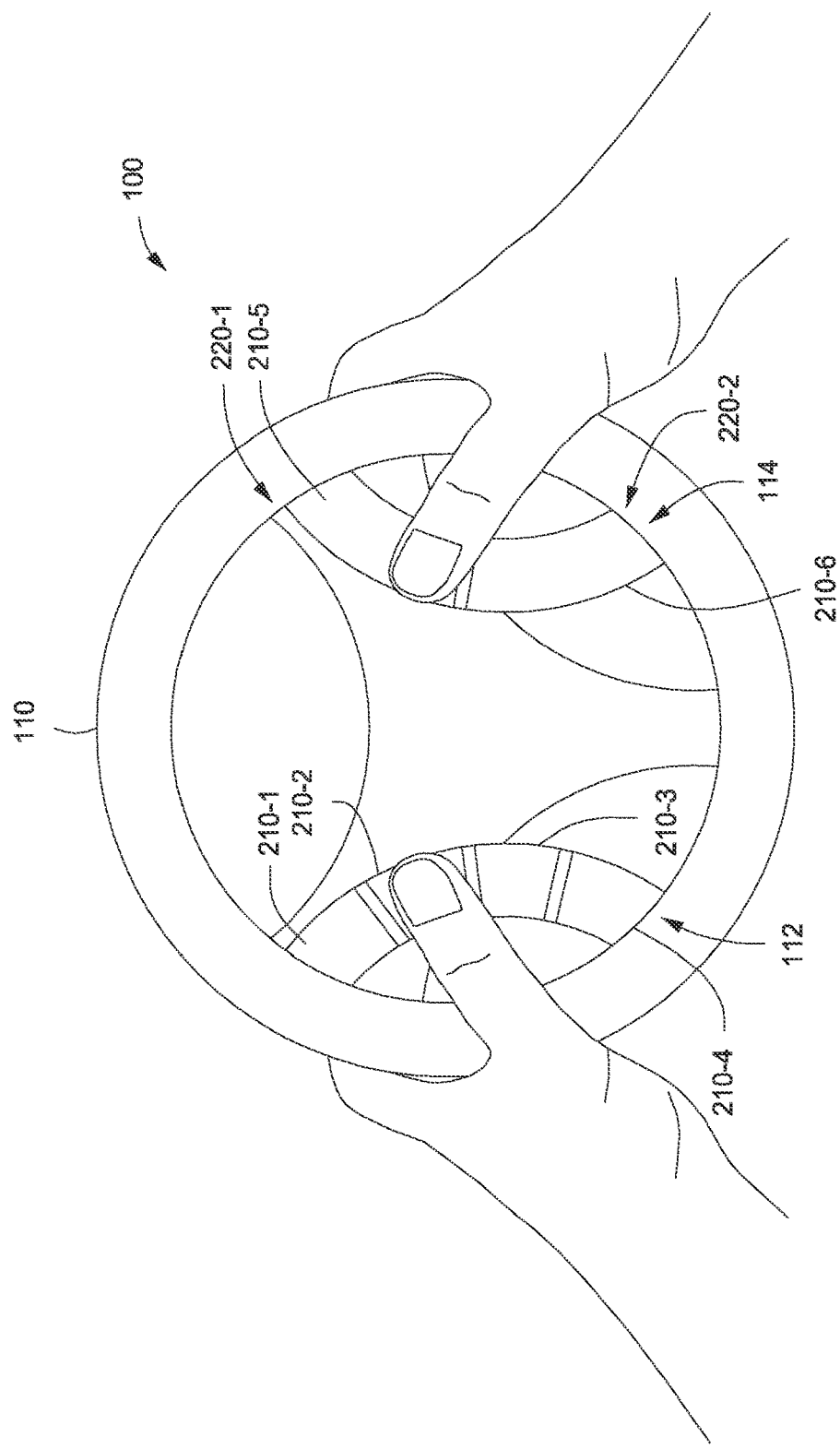

FIGS. 3A and 3B illustrate techniques for modifying different vehicle parameters via the input regions 210 of FIG. 2, according to various embodiments. As shown in FIG. 3A, a user may select a vehicle parameter associated with the climate control system 160 (e.g., temperature, fan speed, zone, mode) by selecting input region 210-3 with his or her left thumb. Then, at substantially the same time or within a threshold period of time, the user may specify that the vehicle parameter should be decreased (or toggled) by selecting input region 210-6 with his or her right thumb. Additionally, as shown in FIG. 3B, the user may select a vehicle parameter associated with the multimedia system 140 (e.g., volume, track, folder, source) by selecting input region 210-2 with his or her left thumb. Then, at substantially the same time or within a threshold period of time, the user may specify that the vehicle parameter should be increased (or toggled) by selecting input region 210-5 with his or her right thumb.

After an initial modification to a vehicle parameter, the vehicle parameter may remain selected for a predetermined period of time (e.g., 1 to 3 seconds), during which the user can continue to modify the vehicle parameter (e.g., via the right-hand controls 114) without needing to re-select the vehicle parameter. In other embodiments, after an initial modification to a vehicle parameter, the vehicle parameter may remain selected until the user removes his or her finger from the input region 210 associated with the vehicle parameter. For example, with reference to FIG. 3A, after initially selecting and modifying the vehicle parameter associated with input region 210-3, the user could continue to modify the vehicle parameter, such as by increasing or decreasing the parameter via the right-hand controls 114, without needing to re-select the vehicle parameter.

As described above, in some embodiments, the vehicle parameter may be modified via distinct input regions 210 (e.g., input regions 210-5 and 210-6 in FIGS. 3A and 3B) that increase, decrease, and/or toggle the vehicle parameter. In other embodiments, the vehicle parameter may be modified via a single input region 210 that represents a continuum of values that could be assigned to the vehicle parameter. For example, with reference to FIGS. 3A and 3B, the right-hand controls 114 could implement a single input region 210 having a first end 220-1 that corresponds to a high value (e.g., a maximum value) and a second end 220-2 that corresponds to a low value (e.g., a minimum value). In such embodiments, a user may move his or her thumb within the single input region 210 to dynamically modify the vehicle parameter.

Further, in some embodiments, the continuum of values associated with the single input region 210 could be statically mapped to specific locations within the input region 210, such that the selected vehicle parameter is modified based on the location of the input region 210 that is initially selected by the finger of the user. In such embodiments, the location of the input region 210 that is initially selected by the finger of the user could be determined relative to a reference location (e.g., a center of the input region 210). For example, if a user initially selects a location that is at or near the first end 220-1 of the input region 210 (e.g., a maximum distance from a reference location at the center of the input region 210), then the vehicle parameter may be increased to a maximum value.

Alternatively, the continuum of values associated with the single input region 210 could be dynamically mapped to locations within the input region 210. For example, the control application 130 could map the location of the input region 210 initially selected by the user to the current value of the vehicle parameter. In such embodiments, the vehicle parameter is not modified when the finger of the user initially selects the input region 210, but the vehicle parameter is increased or decreased as the user moves his or her finger towards the first end 220-1 or the second end 220-2 of the input region 210.

Figure 4A:
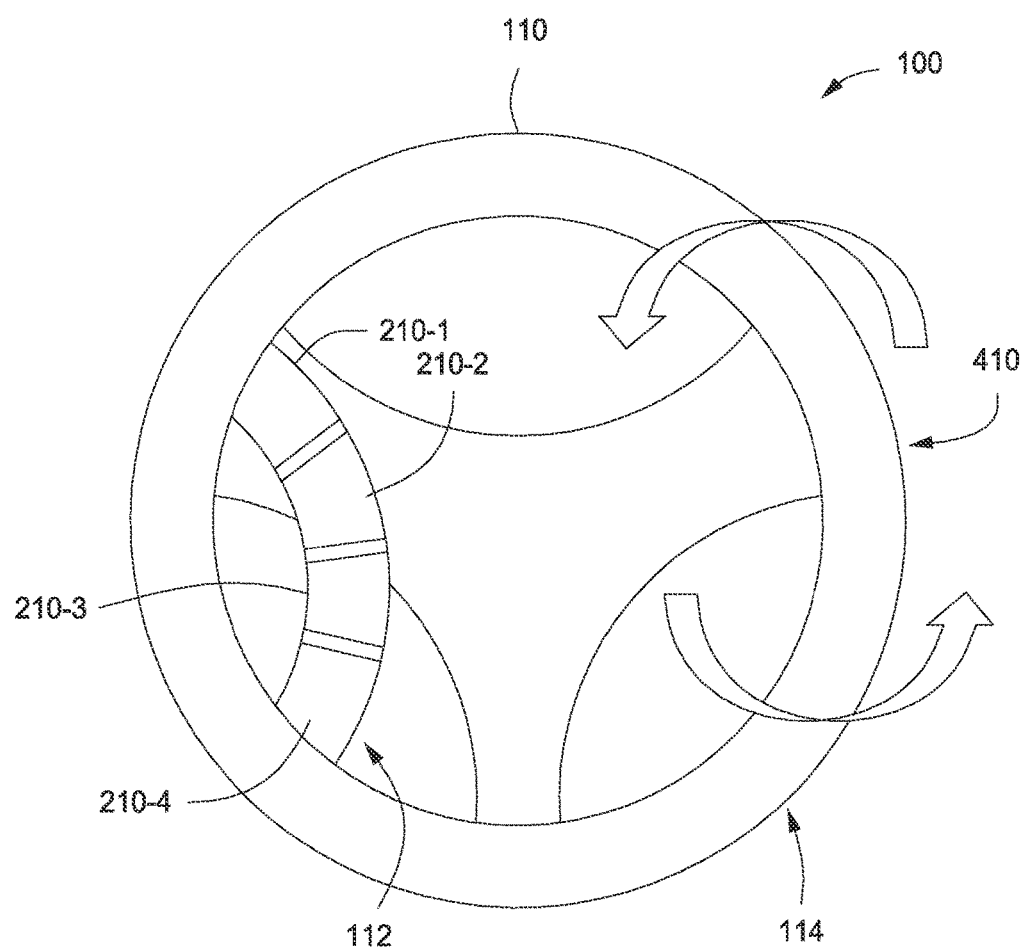
FIGS. 4A-4C illustrate techniques for modifying different vehicle parameters via one of the input regions of FIG. 2 and a force sensor coupled to the steering wheel of FIG. 1, according to various embodiments.
Figure 4B:
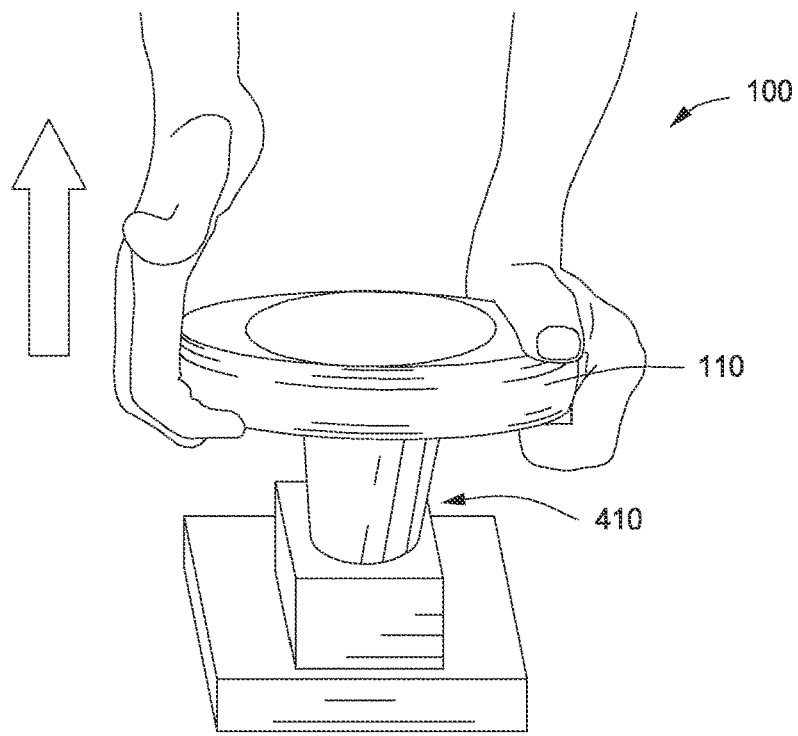
Figure 4C:
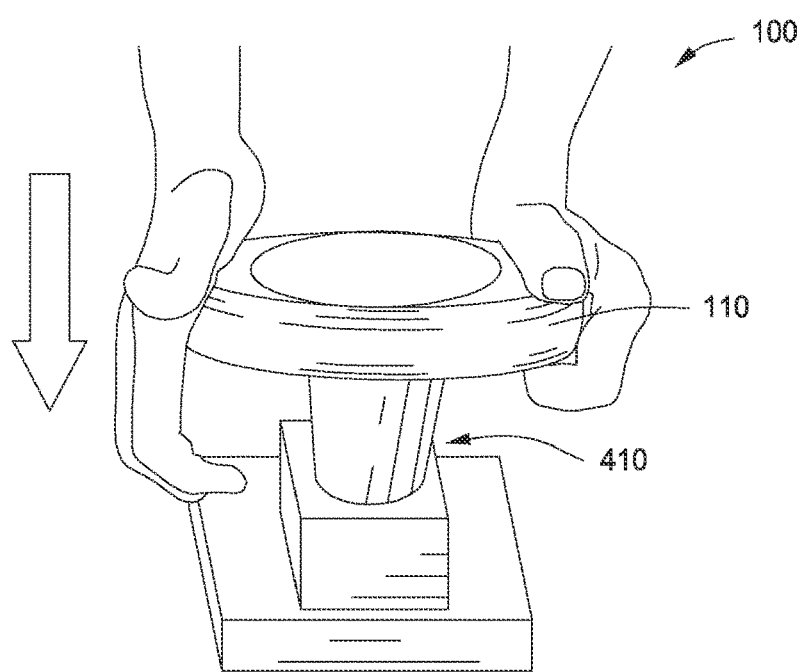

FIGS. 4A-4C illustrate techniques for modifying different vehicle parameters via one of the input regions 210 of FIG. 2 and a force sensor 410 coupled to the steering wheel of FIG. 1, according to various embodiments. One or more force sensors 410 may be coupled to the steering wheel 110 to detect when a user is exerting physical force on the steering wheel 110. The control application 130 may then modify a selected vehicle parameter based on the force exerted on the steering wheel 110. For example, the force sensor(s) 410 could measure physical forces exerted on the steering wheel 110 and output sensor data to the control application 130 that reflects the magnitude, direction, position, and other attributes associated with those forces. The control application 130 then determines a modifier associated with the forces and modifies the vehicle parameter based on the modifier.

Examples of forces that could be applied to the steering wheel 110 include, without limitation, a torque input, a pressure input, and a shearing input. For example, with reference to FIG. 4B, after a vehicle parameter is selected (e.g., via the left-hand controls 112), the user could pull the right side of the steering wheel 110 (from the perspective of the user) towards himself or herself to cause the vehicle parameter to increase. Additionally, with reference to FIG. 4C, after the same vehicle parameter or a different vehicle parameter is selected, the user could push the right side of the steering wheel 110 away from himself or herself to cause the vehicle parameter to decrease. Similarly, a vehicle parameter may be increased or decreased based on a direction in which a torque input or a shearing input is applied to one or more portions of the steering wheel 110 while the vehicle parameter is selected.

In general, the force sensor(s) 410 may be located at any technically feasible position relative to the steering wheel 110 to detect forces exerted by the user. For example, the force sensor(s) 410 could be positioned within an inner surface of the steering wheel 110, coupled to an outer surface of the steering wheel 110, and/or coupled to a steering column associated with the steering wheel 110.

In various embodiments, right-hand controls 114 (or left-hand controls 112) that implement the force sensor(s) 410 may operate in substantially the same manner as described above. For example, the control application 130 could modify a particular vehicle parameter only if the user selects the vehicle parameters via the left-hand controls 112 at substantially the same time as (or within a threshold period of time of) applying a force via the right-hand controls 114. Additionally, the user may continue to modify the vehicle parameter via the force sensor(s) 410 as long as the user continues to select the vehicle parameter (e.g., by selecting the corresponding input region 210).

Figure 5:
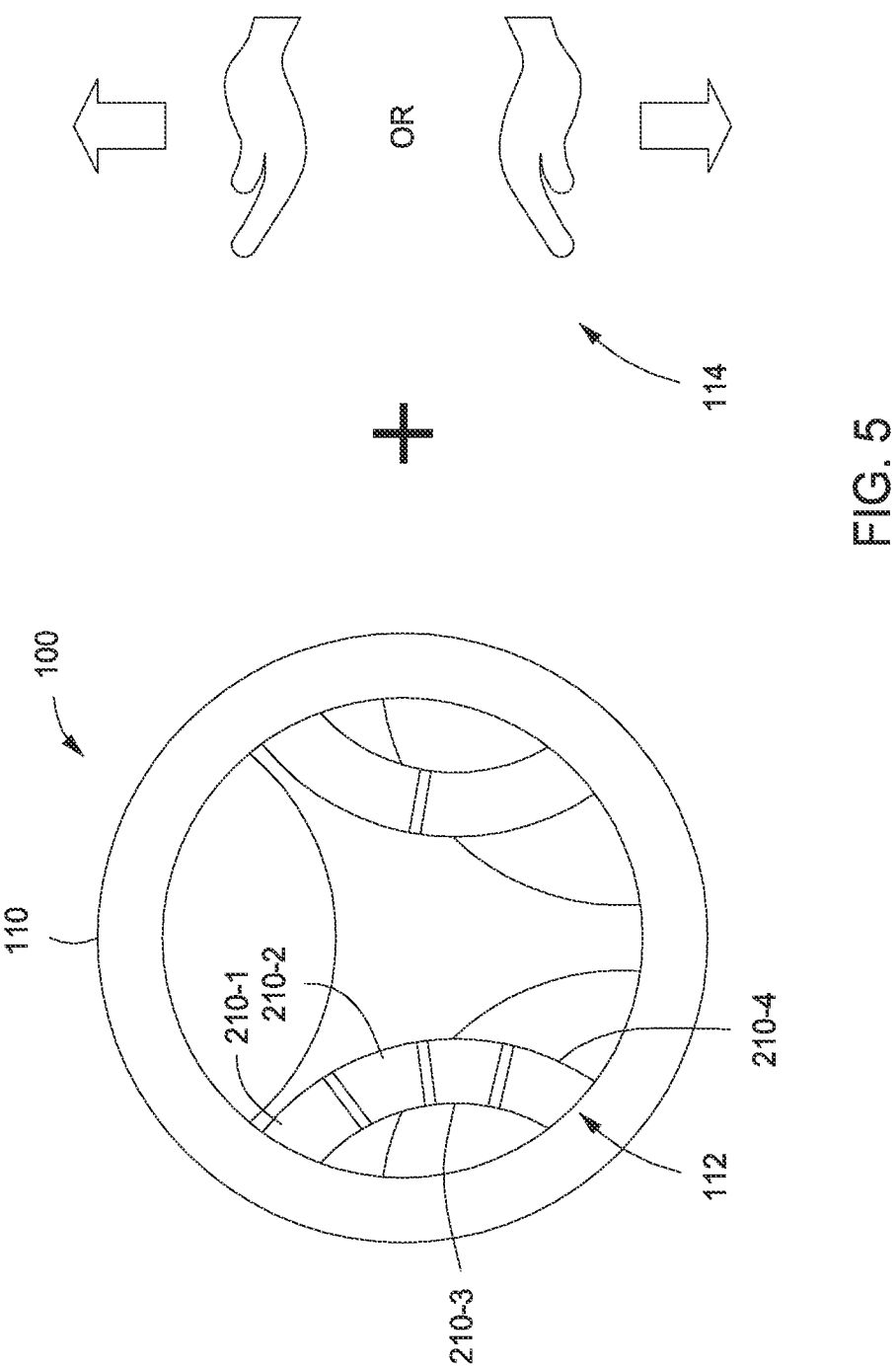
FIG. 5 illustrates techniques for modifying different vehicle parameters via one of the input regions of FIG. 2 and one or more hand gestures, according to various embodiments.

FIG. 5 illustrates techniques for modifying different vehicle parameters via one of the input regions 210 of FIG. 2 and one or more hand gestures, according to various embodiments. As described above, the system 100 may include one or more sensors (e.g., visual sensors, depth sensors, infrared sensors, time-of-flight sensors, ultrasound sensors, radar sensors, laser sensors, thermal sensors, structured light sensors) that track the location of the hand(s) of a user. In such embodiments, a user hand gesture may be detected by the control application 130 via the sensor(s), and a selected vehicle parameter may be modified based on the gesture.

Examples of gestures that could be performed by a user to modify a vehicle parameter include, without limitation, an up gesture (e.g., by raising a hand or palm), a down gesture (e.g., by lowering a hand or palm), a clockwise/counterclockwise rotation gesture (e.g., by rotating a hand clockwise or counterclockwise), and a next/previous gesture (e.g., by swiping a hand to the right or left). For example, with reference to FIG. 5, after a vehicle parameter is selected (e.g., via the left-hand controls 112), a user could raise or lower his or her palm to perform an up gesture or a down gesture, respectively. The control application 130 could then detect the up gesture or down gesture via the sensor(s) and, in response, increase or decrease the selected vehicle parameter, respectively.

Alternatively, instead of (or in addition to) performing a gesture, a user could speak a command to a microphone coupled to the system 100. The control application 130 could then process the command and modify a vehicle parameter based on the command. Example of voice commands include, without limitation, "increase"/"decrease," "up"/"down," "next"/"previous," and "on"/"off."

Figure 6:
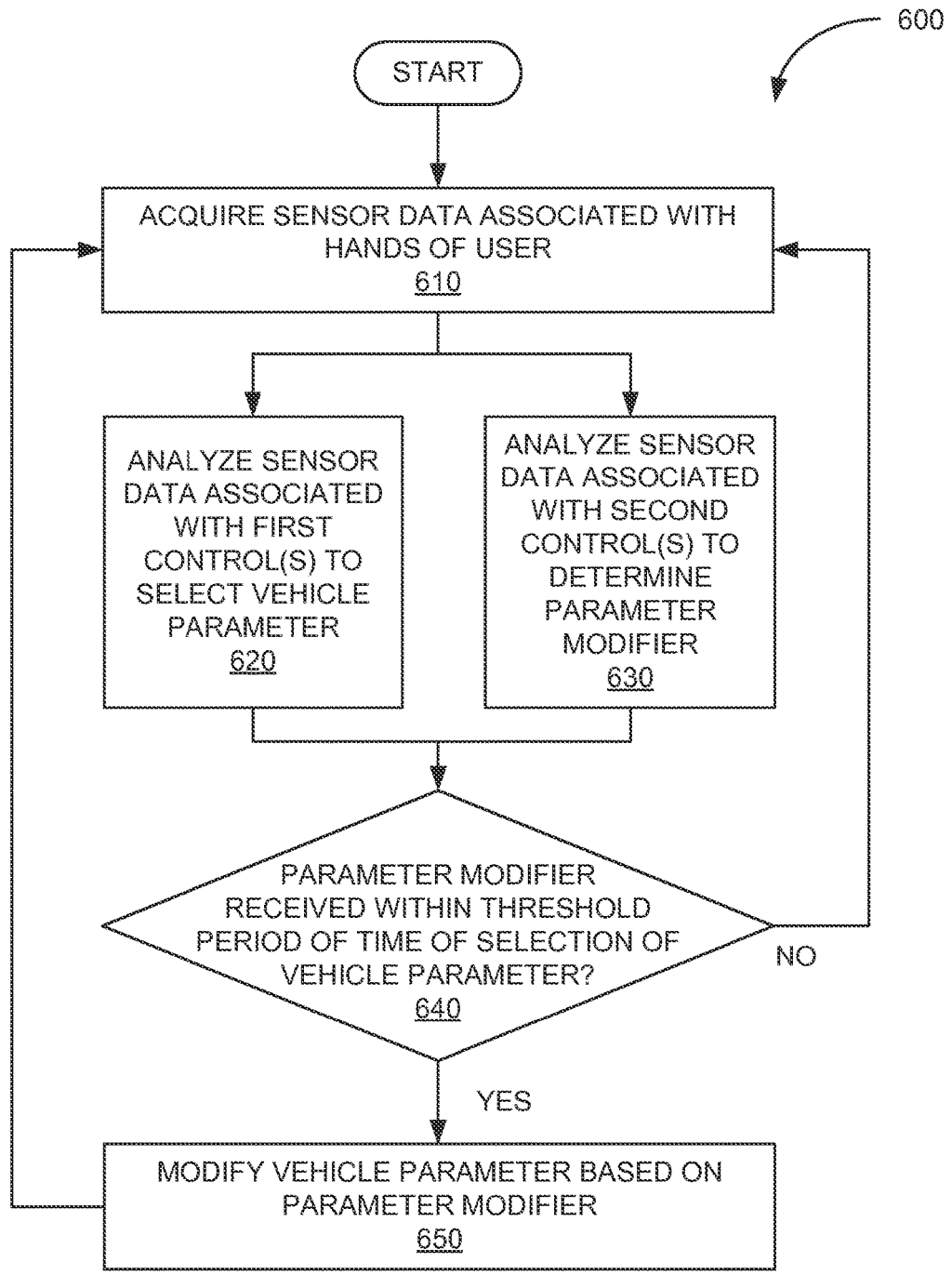
FIG. 6 is a flow diagram of method steps for modifying different vehicle parameters based on bimanual inputs, according to various embodiments.

FIG. 6 is a flow diagram of method steps for modifying different vehicle parameters based on bimanual input, according to various embodiments. Although the method steps are described in conjunction with the systems of FIGS. 1-5, persons skilled in the art will understand that any system configured to perform the method steps, in any order, falls within the scope of the present disclosure.

As shown, a method 600 begins at step 610, where the control application 130 acquires sensor data associated with the hands of a user (e.g., bimanual input) via the left-hand controls 112 and/or the right-hand controls 114. As described above, the sensor data may include the locations and orientations of the hands, fingers, and/or arms of the user. At step 620, the control application 130 analyzes the sensor data associated with a first set of controls (e.g., the left-hand controls 112) to determine which vehicle parameter is being selected by the user. In some embodiments, the control application 130 analyzes the sensor data to determine an input region being selected by a finger of a user and selects a vehicle parameter associated with the input region.

At step 630, the control application 130 analyzes the sensor data associated with a second set of controls (e.g., right-hand controls 114) to determine how the vehicle parameter should be modified. As described above, the control application 130 may analyze the sensor data to determine an input region—and, in some embodiments, a specific location within the input region—being selected by a finger of a user. The control application 130 then may select a parameter modifier associated with the input region or the location within the input region. As described above, in various embodiments, step 620 and step 630 may be performed at substantially the same time.

At step 640, the control application 130 determines whether the user input received via the second set of controls was within a threshold period of time of the user input received via the first set of controls. In some embodiments, the threshold period of time is less than 1 second (e.g., user input was received via both the first set of controls and the second set of controls at substantially the same time) while, in other embodiments, the threshold period of time may be longer (e.g., 1 to 3 seconds). If the user input received via the second set of controls was within a threshold period of time of the user input received via the first set of controls, then the method 600 proceeds to step 650, where the control application 130 modifies the selected vehicle parameter based on the parameter modifier. If the user input received via the second set of controls was not within a threshold period of time of the user input received via the first set of controls, then the method 600 returns to step 610, where the control application 130 continues to acquire sensor data via the left-hand controls 112 and/or the right-hand controls 114.

In sum, sensor data associated with one or both hands of the user is acquired via one or more sensors. The sensor data is then analyzed by a control application to determine which vehicle parameter is being selected by a user as well as how the vehicle parameter should be modified. The control application may further determine whether selection of the vehicle parameter and selection of a parameter modifier were received at substantially the same time or within a threshold period time of each other. If selection of the vehicle parameter and selection of a parameter modifier were received at substantially the same time or within a threshold period time of each other, then the control application modifies the vehicle parameter based on the parameter modifier.

At least one advantage of the techniques described herein is that a user is able to modify parameters associated with various types of vehicle systems without looking away from the road and/or without taking his or her hands off of the steering wheel. Accordingly, the steering wheel controls can be operated with a low cognitive load, reducing the degree to which operation of vehicle systems distracts the driver from driving tasks. Additionally, the techniques described herein enable the multiple sets of physical buttons typically found in conventional vehicle systems to be replaced with a simpler and less expensive interface.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope set forth in the appended claims. For example, and without limitation, although many of the descriptions herein refer to specific types of sensors, input regions, and vehicle parameters, persons skilled in the art will appreciate that the systems and techniques described herein are applicable to other types of sensors, input regions, and vehicle parameters. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to modify vehicle parameters based on bimanual input, by performing the steps of:
   acquiring first sensor data associated with a first finger of a user and second sensor data associated with a second finger of the user;
   determining that the first sensor data was acquired within a predetermined period of time of acquiring the second sensor data;
   analyzing the first sensor data to determine a first location of the first finger;
   analyzing the second sensor data to determine a second location of the second finger;
   selecting a first vehicle parameter based on the first location of the first finger;
   determining a modified first vehicle parameter based on the second location of the second finger; and
   controlling a first auxiliary component within a vehicle based on the modified first vehicle parameter.

2. The non-transitory computer-readable storage medium of claim 1, wherein determining the modified first vehicle parameter is performed based on determining that the first finger moved to the first location and the second finger moved to the second location at substantially a same time.

3. The non-transitory computer-readable storage medium of claim 1, wherein determining the modified first vehicle parameter is performed based on determining that the second finger moved to the second location within the predetermined period of time subsequent to the first finger moving to the first location.

4. The non-transitory computer-readable storage medium of claim 1, further comprising analyzing the sensor data to determine that the second finger moved from the second location to a third location while the first finger remained at the first location, and, in response, increasing or decreasing the first vehicle parameter.

5. The non-transitory computer-readable storage medium of claim 4, wherein the first vehicle parameter is increased or decreased by an amount that is based on a distance between the second location and the third location.

6. The non-transitory computer-readable storage medium of claim 1, wherein determining the modified first vehicle parameter comprises increasing or decreasing the first vehicle parameter based on a distance between the second location and a reference location on a steering wheel.

7. The non-transitory computer-readable storage medium of claim 1, further comprising:
   analyzing the sensor data to determine a third location of the first finger and a fourth location of the second finger;
   selecting a second vehicle parameter based on the third location of the first finger; and
   determining a modified second vehicle parameter based on the fourth location of the second finger.

8. The non-transitory computer-readable storage medium of claim 7, wherein each of the first vehicle parameter and the second vehicle parameter comprises at least one of a multimedia parameter, a navigation parameter, a climate control parameter, and a vehicle throttle parameter.

9. The non-transitory computer-readable storage medium of claim 1, wherein the first finger and the second finger comprise a left thumb of the user and a right thumb of the user.

10. A system for modifying vehicle parameters based on bimanual input, the system comprising:
    at least one sensor configured to acquire first sensor data associated with a first finger of a first hand of a user and second sensor data associated with a second hand of the user;
    a processor coupled to the at least one sensor and configured to:
       determine that the first sensor data was acquired within a predetermined period of time of acquiring the second sensor data;
       analyze the first sensor data to determine a first location of the first finger of the user;
       analyze the second sensor data to determine a first input performed by the second hand of the user;
       select a first vehicle parameter based on the first location of the first finger;
       determine a modified first vehicle parameter based on the first input performed by the second hand of the user; and
       control a first auxiliary component within a vehicle based on the modified first vehicle parameter.

11. The system of claim 10, wherein the processor is configured to determine the modified first vehicle parameter based on determining that the first finger moved to the first location and the first input was performed by the second hand at substantially a same time.

12. The system of claim 10, wherein the processor is configured to determine the modified first vehicle parameter based on determining that the first input was performed by the second hand within the predetermined period of time subsequent to the first finger moving to the first location.

13. The system of claim 10, wherein the at least one sensor comprises a force sensor coupled to a steering wheel, and the first input comprises at least one of a torque input, a pressure input, and a shearing input applied to the steering wheel.

14. The system of claim 13, wherein the processor is configured to increase the first vehicle parameter when the first input has a first direction and decrease the first vehicle parameter when the first input has a second direction.

15. The system of claim 10, wherein the at least one sensor comprises a touch sensor, and the first input comprises at least one of a tapping gesture and a swiping gesture.

16. The system of claim 10, wherein the at least one sensor comprises at least one of a camera, a depth sensor, an infrared sensor, a time-of-flight sensor, and an ultrasound sensor for tracking a location of the second hand of the user, and the first input comprises at least one hand gesture performed by the second hand of the user.

17. The system of claim 10, wherein the processor is further configured to:
   analyze the sensor data to determine a second location of the first finger of the user and a second input performed by the second hand of the user;
   select a second vehicle parameter based on the second location of the first finger; and
   determine a modified second vehicle parameter based on the second input performed by the second hand of the user.

18. The system of claim 10, wherein the at least one sensor comprises a camera configured to capture one or more images, and the processor is configured to determine the first location of the first finger of the user by analyzing the one or more images to determine at least one input region occupied by the first finger of the user.

19. A method for modifying a vehicle parameter based on bimanual input, the method comprising:
   acquiring first sensor data associated with a first thumb of a user and second sensor data associated with a second thumb of the user;
   determining that the first sensor data was acquired within a predetermined period of time of acquiring the second sensor data;
   analyzing the first sensor data to determine a first input region occupied by the first thumb;
   analyzing the second sensor data to determine a second input region occupied by the second thumb;
   selecting a first vehicle parameter based on the first input region;
   determining a modified first vehicle parameter based on the second input region; and
   controlling a first auxiliary component within a vehicle based on the modified first vehicle parameter.

20. The method of claim 19, wherein modifying the first vehicle parameter is performed based on determining that the second thumb moved to the second input region within the predetermined period of time subsequent to the first thumb moving to the first input region.

* * * * *